United States Patent Office 3,324,102
Patented June 6, 1967

3,324,102
WATER-SOLUBLE BENZIMIDAZOLE-CONTAINING COORDINATION COMPOUNDS AND METHODS RELATING THERETO
Raymond J. La Pierre, Iselin, N.J., assignor to Merck & Co., Inc., Rahway, N.J., a corporation of New Jersey
No Drawing. Filed Jan. 31, 1963, Ser. No. 255,225
5 Claims. (Cl. 260—96.5)

This invention relates to novel water-soluble benzimidazole compositions useful in the treatment and control of helminthic infections. More particularly, the present invention relates to novel water-soluble anthelminthic benzimidazole-urea-acid complexes, to compositons prepared therefrom and to methods for preparing and utilizing the same.

The infection known generically as helminthiasis involves infestation of the body of warm-blooded animals and particularly the gastro-intestinal track of man and domestic animals such as sheep, cattle, goats, swine, dogs and poultry with certain species of parasitic worms known as helminths. Among the helminthic parasites, the most commonly occurring in domestic animals are those of the phylum Nemathelminthes and particularly the nematodes of the genera Haemonchus, Trichostrongylus, Ostertagia, Nematodirus, Cooperia, Bunostomum, Oesophagostomum, Chabertia, Trichuris, Ascaris, Cappillaria, Heterakis and Ancylostoma. The diseases attributable to parasitic infections of these organisms as, for example, ascariasis, trichostrongylosis and gross parasitism, are widespread in occurrence and serious in nature. The diseased host almost inevitably suffers from such conditions as malnutrition, anemia and general weakness and malaise. In addition to the above conditons which necessitate increasing the nutrient intake by the host, helminthiasis may well have more disastrous consequences. The diseased host may suffer from a severe inflammation of the intestinal lining which will result in hemorrhaging. Indeed, in more advanced and uncontrolled cases, helminthiasis will lead to prostration and death. It will be apparent, therefore, that helminthiasis is a disease of major concern whether viewed from the aspect of public health or from the aspect of the economic loss resulting from helminthic infestation of domestic animals. Thus, the provision of improved compositions and methods for the treatment and elimination of helminthiasis and the parasitic worms responsible for this disease is most highly welcomed.

Indeed, valuable compounds for use in the treatment and prevention of helminthiasis and its causative agents have been recently discovered. These compounds, certain benzimidazoles, as described in U.S. Patent 3,017,415, have been found to be particularly effective in the treatment of ruminants such as sheep, cattle, goats and the like, while evidencing significant utility as well in man and other monogastrics, such as swine, dogs and poultry. These anthelminthic benzimidazoles, as free bases, however, are virtually completely insoluble in water, and so, unless utilized in the form of certain of their acid addition salts, must be used exclusively in suspension. The aforesaid acid addition salts, the hydrohalides, have been found to impart to the aforesaid bases a degree of water-solubility which is by virtue of its existence much greater therefore than that of the aforesaid bases but which is actually only in the order of about 1 percent to a maximum of about 2 percent by weight of the benzimidazole present. This degree of water-solubility is inadequate where, for example, the anthelminthic benzimidazole known heretofore is to be employed in efficacious drench solutions for domestic animals in uniform concentrations suitable for facile ingestion which should be, therefore, of at least one gram of free base per fluid ounce, a concentration of said base in water of in excess of 3 percent. Further areas of application where concentrated solutions in excess of those possible with the aforesaid acid addition salts are often required, in preference to suspensions, is in the deposition of these agents on the loci of infestation, as, for example, by spraying on soil and barns frequented by domestic animals. In like manner such solutions of acid addition salts are not practicable for packaging or transportation while dissolution of these salts in aqueous medium immediately prior to use is often inconvenient and uniformly slow. It should be noted that the term "drench" whether applied to a suspension or solution is a word of art intended to designate those aqueous compositions introduced orally into the digestive tract of a warm-blooded animal and normally a domestic animal.

Accordingly, the present invention provides novel compositions, as indicated above, which are effective in treatment, prevention and control of helminthiasis; which are at the same time safe, effective, and reliable when used for these purposes; and are easily and conveniently applied in uniform concentrations, eliminating substantially the problems described hereinabove. It will be apparent within the purview of this statement that the compounds of the present invention are effective in preventing the development of infective eggs and/or larvae of worms thereby minimizing the possibility of contamination and subsequent reinfestation.

Thus, a particular advantage of the present invention is the provision of novel coordination compounds which utilize the significant anthelminthic activity of the benzimidazoles of the aforesaid U.S. Patent 3,017,415 while incorporating these latter agents in complexes of unexpectedly significant and rapid water-solubility. A further advantage resides in the enhanced anthelminthic activity possessed by the compounds of the invention and their component benzimidazoles when employed in the aqueous media as described herein.

Thus, the novel anthelminthic compositions of the invention are complexes of a substituted benzimidazole, a urea and an acid or acids, the actual molal ratio of the foresaid components being 1:1:1 when only sulfamic acid or formic acid is present. This equimolal ratio is changed and the ratio can be recited as 1:1:3 respectively where both sulfamic acid and formic acid are present in the final product, in which event, the proportion is 1 mole equivalent of sulfamic acid to 2 moles of formic acid therein. These novel coordination compounds may be represented by the general structural formula:

(I) 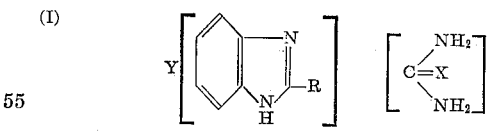

wherein R is a five-membered heterocyclic radical containing nitrogen and sulfur; X is an oxygen or sulfur atom; and Y is sulfamic acid (amidosulfonic acid) or formic acid or a combination thereof.

Thus, elaborating on the foregoing formula, it may be stated that Y represents a single mole of sulfamic acid, A, or a single mole of formic acid, B, or a combination thereof, having the molar relationship described above in the subject complexes, which can then be expressed by the formula:

The five membered heterocyclic radical (R in the above formula), which is attached to the benzimidazole at one of its carbon atoms, may be a thiazolyl, isothiazolyl or thiadiazolyl radical. When R is a thiazolyl or isothiazolyl moiety, the point of attachment to the benzimidazole nucleus may be at any one of the three carbon atoms of the heterocyclic ring as indicated by the broken lines in the partial structures, i.e. the respective thiazolyl and isothiazolyl radicals:

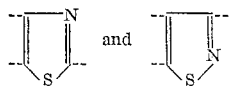

When R is a thiadiazolyl group containing two nitrogen atoms and one sulfur atom in the ring, the radical may be attached to the benzimidazole at either of the two carbon atoms in a 1,2,3-thiadiazole or a 1,2,4-thiadiazole of the respective formulae:

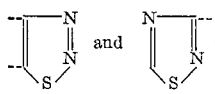

With the symmetrical thiadiazoles, i.e. 1,2,5-thiadiazole or 1,3,4-thiadiazole respectively, only one point of attachment exists:

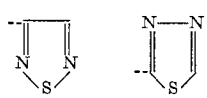

The heterocyclic radical may, if desired, be further substituted at a carbon atom with a lower hydrocarbon group such as a lower alkyl radical, the only limitation in this regard being that imposed by the availability of the substituted thiazoles, isothiazoles or thiadiazoles to be used as starting materials.

2-(2'-thiazolyl)-benzimidazoles having a lower alkyl radical at the 4-position of the thiazole ring and the 2-(5'-isothiazolyl)-benzimidazoles having a lower alkyl group at the 3-position of the isothiazole ring such as 2-(4'-methyl-2'-thiazolyl)-benzimidazole and 2-(3'-methyl-5'-isothiazolyl)-benzimidazole are illustrative of the benzimidazoles employed as components of the complexes of this invention.

Illustrative of the substituted benzimidazole components for use in the instant coordination compounds are 2-(2'-thiazolyl)-benzimidazole, 2-(4''-thiazolyl) - benzimidazole, 2 - (4' - isothiazolyl) - benzimidazole, 2 - [4-(1',2',3', - thiadiazolyl)]-benzimidazole, 2-[5'-(1',2',4',-thiadiazolyl)] benzimidazole, 2 - [3' - (1',2'5'-thiadiazolyl)] - benzimidazole and 2-(5'-thiazolyl)-benzimidazole. The 2-(2'-thiazolyl)- and 2-(4'-thiazolyl)-benzimidazole components are markedly preferred in the practice of this invention.

As is apparent in general Formula I above, wherein X is oxygen or sulfur, the urea component is either urea or thiourea. While the latter is therefore a practicable component in the complexes of the present invention, the former, i.e. urea, is significantly preferred. Likewise, sulfamic acid is markedly preferred to formic acid therein.

Accordingly, the preferred coordination compounds or complexes of the present invention may be represented as follows:

(II) 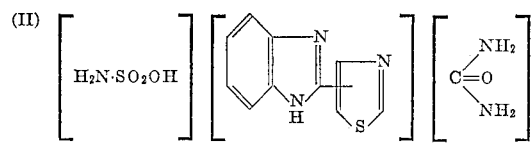

wherein the thiazolyl moiety is attached to the benzimidazole nucleus by means of the 2- or 4-position of said thiazole moiety, e.g. 2-(4'-thiazolyl)-benzimidazole-urea-sulfamic acid. The components of these novel complexes are present, as described above, in a ratio of 1:1:1. Where thiourea is substituted for the urea of the preferred compounds, the solubility of the resulting compounds in aqueous media is reduced, e.g. to about 7 percent to 8 percent. Where formic acid replaces sulfamic acid in the product complexes, the solubility is also reduced. The water-solubility attained for these less preferred manifestations of the invention is, however, still significantly superior to that secured with the anthelminthic benzimidazoles known heretofore.

The complexes of the invention are prepared by admixing the benzimidazole, urea and acid components either in the dry state or in an aqueous medium. The reactants are normally admixed, whether in a dry or aqueous state, in proportions of 1 to 4 moles of urea (or thiourea), to 1 mole of benzimidazole and 1 mole, or slightly in exces thereof, of acid where only sulfamic acid or formic acid reactant is employed. Where both acids are present, however, 1 mole equivalent of sulfamic acid and 2 moles of formic acid are utilized. The preferred ratio of urea (or thiourea) is within the range of 2 to 4 moles thereof or 1 to 3 moles of urea (or thiourea) in excess of that combined with the benzimidazole component employed. Where prepared in an aqueous solution in a concentration suitable for maintenance of said coordination compound therein, the concentrated product solution itself may be employed directly for treatment of helminthiasis or for the preventive spraying of barns, soil, or equipment. In any event, such solutions are conveniently stored and transported. It is also feasible to prepare solid products of the instant coordination compounds by reaction of the components at an elevated temperature, e.g. up to 70° C., and in the proportions recited above but at a concentration in excess of the solubility of the product compounds by crystallization upon cooling, e.g. down to 4° C. The reaction temperature is not critical but where the reaction proceeds in an aqueous medium, it is normally desirable to elevate the temperature of the reaction mixture to within a range of 35° C. to 70° C. The quantity of water employed is also seen to be lacking in criticalness normally since the product may be prepared even as a dry powder, as noted above. However, aqueous solutions containing less than 5 percent and particularly less than 0.1 percent of reactants by weight of the benzimidazole employed down to but not including the substantially dry reaction components, should not be employed to effect reaction since, particularly below 0.1 percent, formation of the subject coordination compounds will not occur. Also, where it is desired to store or ship the product solutions as prepared, the percentage of benzimidazole component in the subject compounds may not exceed about 14 percent by weight of the water employed where, for example, a single acid, e.g. sulfamic acid, is also present as a component. Unexpectedly, however, solutions of up to 20 percent and higher can be prepared where sulfamic acid and formic acid are present as the acid component of the subject compounds, in which case the acid components of the complex are present in the ratio of one mole of sulfamic acid and two moles of formic acid per mole of benzimidazole, as noted above.

Product solutions of 10 percent to 10.5 percent and particularly those of a concentration of about 10.3 percent are preferred because of the uniquely extended period they remain in solution at a wide range in temperature; even significantly below ambient temperatures, e.g. 4° C. Relatively dilute product solutions can also be prepared, but these are normally of about 5 percent of benzimidazole component. Below this concentration dissociation of the subject coordination compounds tends to occur with a further and consequent tendency toward formation of a benzimidazole formate or sulfamate. Where, however, an excess of urea (or thiourea), i.e. 1 to 3 moles in excess, is present either from the inception of the reaction as described above or by subsequent addition, crystallization from even dilute solutions is inhibited.

It is also desirable and indeed preferred and advisable in those instances where the benzimidazole employed in the practice of the invention is to be utilized ultimately in a very dilute solution, and possibly in so-called "hard"

water, to incorporate a polycarboxylic acid, and more particularly one containing at least one hydroxy moiety, e.g. an aliphatic dicarboxylic acid containing one hydroxy substituent and from 2 to 10, or more desirably 2 to 6, carbon atoms, and preferably citric acid. Other illustrative polycarboxylic acids which can be employed are oxalic acid and succinic acid. Acids, such as citric acid, are particularly preferred not only for their acidic properties but also for their chelating characteristics as well. The polycarboxylic acid is added to either the reactants or reaction product, in the dry or aqueous stage. It is normally provided, however, that the percentage of polycarboxylic acid by weight of the urea or thiourea, sulfamic or formic acid, and benzimidazole reactants, does not exceed about 17 percent, or in terms of the benzimidazole component alone, about 40 percent.

Thus, the preferred anthelminthic composition for use in aqueous solution is one composed of 1 mole of 2-(4'-thiazolyl)-benzimidazole-urea-sulfamic acid, about 3 moles of urea and about 17 percent by weight of the aforesaid components of citric acid.

The polycarboxylic acid can be added at any time, thus, for example, at the inception of the reaction of the components forming the instant complexes or at any time thereafter and before or after the addition of water thereto.

By way of illustrating the utility of the foregoing polycarboxylic acids in the practice of the present invention, it has been observed that the addition of the preferred citric acid, for example, to the preferred coordination complex, 2 - (4'-thiazolyl)-benzimidazole-urea-sulfamic acid in a 10 percent aqueous solution containing free urea and wherein the water is Rahway, N.J., tap water, eliminates the tendency toward crystallization of 2-(4'-thiazolyl)-sulfamate from the aforesaid complex-containing solution when this solution is incrementally diluted down to and through a percentage of 0.125 percent to 0.0125 percent by weight of the benzimidazole base component.

The preferred concentration in aqueous solution of coordination compound based on the percentage of benzimidazole base present therein is from 10 percent to 12.5 percent. The lower end of this range and, ideally, a 10.3 percent solution, is preferred where the solution is to be diluted ultimately for use in drinking water or the like. The upper end of the range, i.e. 12.5 percent solution, is preferred where the ultimate use contemplated is a drench solution. This solution concentration range is economically efficacious and at the same time provides solutions which are maintained for indefinite and extended periods under a broad variety of circumstances to which they may be exposed in storage and transportation.

Aqueous solutions such as the aforesaid are rapidly formed at room temperature and can be diluted to the usual levels of use by standard proportionators which meter one ounce of concentrate per gallon of water. Illustratively, a 10.3 percent solution of the coordination complex, 2 - (4' - thiazolyl)-benzimidazole-urea-sulfamic acid containing, in addition, 17 percent of citric acid by weight of the foregoing complex, can be diluted in the standard proportionator to provide a suitable concentration for drinking water of under 0.1 percent, e.g. .0025 percent to .0800 percent, in the manner indicated in Table I.

*Table I*

| Amount of 10.3% solution added per gallon of concentrate: | Resulting 2-(4'-thiazolyl-benzimidazole level in the drinking water, percent |
|---|---|
| 4 fl. oz. (¼ pint) | 0.0025 |
| 8 fl. oz. (½ pint) | 0.0050 |
| 16 fl. oz. (1 pint) | 0.0100 |
| 20 fl. oz. | 0.0125 |
| 32 fl. oz. (1 quart) | 0.0200 |
| 40 fl. oz. | 0.0250 |
| 56 fl. oz. (1½ quarts or 3 pints) | 0.0300 |
| 64 fl. oz. (2 quarts) | 0.0400 |
| 70 fl. oz. (5 pints) | 0.0500 |
| 96 fl. oz. (3 quarts) | 0.0600 |
| 128 fl. oz. (1 gallon as is) | 0.0800 |

The solution of foregoing Table I can of course be modified to utilize an even number of fluid ounces for each gallon of concentrate. A solution of this concentration, i.e. 10.3 percent, evidences only minimal crystallization when stored at 4° C. for a period of 48 hours and upon minimal warming, e.g. to 5° C. to 8° C., the crystals formed rapidly redissolve. Accordingly, this solution is satisfactory for storage and transportation, even under such adverse conditions as occur in northern winter climates.

In order to provide drinking water dispersed from barrels at standard use levels of under 0.1 percent of benzimidazole component, there is needed only the addition of the required amount of the foregoing 10.3 percent solution, as indicated above, followed by moderate agitation.

It is noted that at the aforesaid use levels (as described illustratively in Table I) the dissociation of the complex occurs and the benzimidazole component of the complex is present as the free base.

Drench solutions of the complexes of the invention can also be prepared, as noted above. In these latter solutions consideration need not be given to the presence of a polycarboxylic acid since drench solutions are not employed normally at a concentration of less than about 3 percent or a minimum of 0.5 percent. However, because of the characteristically steep curve of solubility-temperature relationship of the complex, it is preferred to limit the concentration of the complex based on the weight of the benzimidazole component thereof to within the range of 12 percent to 13 percent and particularly to about 12.5 percent (3.7 grams per U.S. fluid ounce). This concentration is suitable at least down to about 4° C. The foregoing 12.5 percent solution can of course be diluted at various concentrations, e.g. 2.5 g./U.S. fluid ounce, 2.0 g./U.S. fluid ounce, 1.5 g./U.S. fluid ounce, 1.0 g./U.S. fluid ounce, utilizing Rahway tap water.

The complexes of the invention can also be prepared as dry powders which can be stored and transported as such and which can be conveniently dissolved in solution by the ultimate user, for example, due to the very rapid solubility of these compounds. For optimum ease in preparing aqueous solutions therefrom, limited water is initially added to the powder to form a slurry whereupon additional water is then added until solution is complete (usually within a period of one to two minutes). The aforesaid powder composition can be metered by a standard proportionator to suitable use levels, e.g. .005 percent to .075 percent, in the manner described in Table II.

*Table II*

| Amount of 28.5% soluble powder required per gal. of concentrate, oz.: | Resulting 2-(4'-thiazolyl)-benzimidazole level in the drinking water, percent |
|---|---|
| 3 | 0.005 |
| 6 | 0.010 |
| 12 | 0.020 |
| 15 | 0.025 |
| 18 | 0.030 |
| 24 | 0.040 |
| 30 | 0.050 |
| 36 | 0.060 |
| 45 | 0.075 |

It is noted that unless otherwise explicitly indicated, percentages referred to herein refer to percentages based on the weight of benzimidazole base component present in a coordination compound of the invention or as the free base itself.

It is noted also that the anthelminthic agents described herein can be conveniently utilized with other standard parasiticides such as arsenic, copper, copper arsenate, and the like where these parasiticidal agents are in suspension or also in solution, and applied in the manner appropriate to these latter agents, and as are well known in the art.

Certainly, too, while preferably used in aqueous solutions as described hereinabove, the coordination complexes of the invention can be employed, for example, therapeutically in the form of a capsule, tablet, bolus, or as a conventional drench suspension or the like. In such manner, the instant compounds are capable of being administered orally in a unit dosage form wherein the compounds may be blended with one or more innocuous orally ingestible excipients including diluents, fillers, binders, lubricants, disintegrating agents, and like standard formulations. Enteric vehicles and compositions, particularly useful for the treatment of animals suffering from severe helminthic infection of the intestinal tract, can also be employed. This enteric property can, for example, be imparted by coating standard tablets and the like containing one of the instant coordination compounds with one of the commonly employed enteric coatings such as those containing fatty acids, resins, waxes, synthetic polymers and the like.

The proportions of active ingredients in the aforesaid media of administration may vary widely depending on the desired dosage sought to be administered to the subject. Thus, tablets, boluses, and the like, whether enteric in nature or not, can incorporate, illustratively, from about 5 percent to about 70 percent of active anthelminthic agent, measured on the basis of the weight of the benzimidazole component of the coordination compound used.

Further, the coordination compounds of the invention can also be administered in powdered form by dispersion in or admixture with the standard elements of animal sustenance such as feed or other orally ingestible carriers, e.g. distillers' dried grains, corn meal, alfalfa, ground oyster shells, crushed limestone, molasses solubles, antibiotic mycelia, corn cob meal and the like. This method is more often employed where it is desired to administer the subject compounds either as therapeutic or prophylactic agents over a period of several days or more.

In either case, the diluent or carrier is substantially inert chemically, innocuous or non-toxic to and orally ingestible by the treated subject.

It will be apparent, however, that such procedures involve the possibility and, indeed, the probability of irregular concentrations of the instant pharmacological coordination compounds as well as other difficulties and disadvantages which are readily avoided by employment of these compounds in the preferred form of their aqueous solutions possessing enhanced efficacy against nematodes and in the treatment of helminthiasis as described hereinabove.

The following examples are further illustrative of the invention but are not to be considered as limitative thereof.

EXAMPLE 1.—PREPARATION OF A SOLID COMPLEX OF 2-(4'-THIAZOLYL)-BENZIMIDAZOLE-UREA-SULFAMIC ACID

To a container equipped with stirrer and source of heat, 400 ml. of water are added, followed by 180 g. (3 mols.) of urea and 107 g. (1.1 mol.) of sulfamic acid. The temperature is raised to 70° C. 201 g. (1 mol.) of 2-(4'-thiazolyl)-benzimidazole are dissolved in the urea-sulfamic acid solution. With stirring, the solution is allowed to cool. With cooling, the 2-(4'-triazolyl)-benzimidazole-urea-sulfamic acid complex crystallizes from the solution. The crystals can be isolated by filtration, washed with a solvent such as acetone and dried. For optimum purity of the complex crystals, the hot solution may be charcoal treated and filtered before crystallization.

*Elemental analysis.*—Found: C=37.0, H=3.88, N=24.52, S=18.26. Theoretical (1:1:1 molal ratio): C=36.9, H=3.92, N=23.4, S=17.9.

UV indicates a 1:1:1 molal relation of 2-(4'-thiazolyl)-benzimidazole, urea and sulfamic acid; X-ray diffraction yields a sharply defined spectrum different from that of any of its components and clearly indicative of good crystalline structure. Analysis of the components of the product complex is effected by forming a 10 percent solution of the product coordination compound, adjusting the pH of an aqueous solution containing 100 mgs. of the product complex to 7, as a result of which 53 mgs. of crystalline 2(4'-thiazolyl)-benzimidazole is secured (theoretical yield: 53 mgs.). The remaining solution after removal of water and trituration with hot methanol yields a 35 mg. residue of sodium sulfamate (theoretical: 32 mgs.). The methanol-solubles, after reduction to a solid residue with trituration using hot acetone, yield 18 mgs. of acetone-soluble urea (theoretical yield: 17 mgs.). All isolated components are examined for identity and purity by infra-red spectra and the resulting data conform to a 1:1:1 molal ratio of the product complex.

Trituration of the solid product complex with hot acetone yields only 2.2 mg./ml. of solubles which by subsequent infra-red examination prove to be unchanged starting material and not urea, as would be the case if the urea was not reacted to form a complex, since urea is soluble in hot acetone to an extent of 8 mg./ml. When 1 mole of urea is added to 1 mole of 2-(4'-thiazolyl)-benzimidazole and the whole dissolved in water and reduced to dryness followed by trituration with hot acetone, the acetone solubles after recovery are demonstrated by infra-red analysis to be the same as that secured from trituration with hot acetone of the solid complex prepared as described hereinabove, i.e. 2.2 mg./ml., and not urea, again evidencing the formation of the complex in the solid phase.

The formation of the aforesaid complex in saturated aqueous solution is demonstrated employing the standard methodology of liquid-liquid distribution. Saturated aqueous solutions of 2-(4'-thiazolyl)-benzimidazole sulfamate and of the aforesaid product complex, 2-(4'-thiazolyl)-benzimidazole-urea-sulfamic acid, are prepared (17 hours at 25° C.) and the distribution coefficients of the clear aqueous phases thereof determined against methylene dichloride. Values of 14 and 96 (water over methylene dichloride, respectively) are obtained. The pH of both saturated solutions is the same after the solvent equilibrations, that is 2.4. The absolute solubilities are shown to be 100 mg./ml. and 220 mg./ml., respectively. These results clearly demonstrate the greatly reduced extractibility of 2-(4'-thiazolyl-)benzimidazole from the aqueous solution of the product complex and indicate, therefore, the complexing in saturated aqueous solutions of the aforesaid 2-(4'-thiazolyl)-benzimidazole since this latter component, as a free base, is virtually insoluble in water and is totally extractible with methylene dichloride.

EXAMPLE 2.—PREPARATION OF A 12.5 PERCENT AQUEOUS SOLUTION OF THE COMPLEX, 2-(4'-THIAZOLYL)-BENZIMIDAZOLE-UREA-SULFAMIC ACID

To a container equipped with stirrer, 1100 ml. of water are added and 180 g. (3 mols.) of urea are dissolved therein. 201 grams (1 mol.) of 2-(4'-thiazolyl)-benzimidazole are suspended in the urea solution and 107 g. (1.1 mols.) of sulfamic acid are then added to the suspension. Solubilization of the 2-(4'-thiazolyl)-benzimidazole commences immediately and is complete in one to two minutes, indicating formation of the complex, 2-(4'-thiazolyl)-benzimidazole-urea-sulfamic acid. Finally, the volume of the solution is adjusted to 1600 ml. with water. For optimum clarity, the solution can be filtered.

EXAMPLE 3.—PREPARATION OF A 10 PERCENT AQUEOUS SOLUTION OF THE COMPLEX, 2-(4'-THIAZOLYL)-BENZIMIDAZOLE-UREA-SULFAMIC ACID, CONTAINING, IN ADDITION, CITRIC ACID

To a container equipped with stirrer, 1400 ml. of water are added and 180 g. (3 mols.) of urea are dissolved therein. 201 Grams (1 mol.) of 2-(4'-thiazolyl)-benzimidazole are suspended in the urea solution. 107 grams (1.1 mols.) of sulfamic acid are added to the suspension. Solubilization of the 2-(4'-thiazolyl)-benzimidazole commences immediately and is complete in one to two minutes with the formation of 2-(4'-thiazolyl)-benzimidazole-urea-sulfamic acid. Finally, 80 g. (0.38 mol.) of monohydrated citric acid are dissolved in the solution. The volume of the solution is adjusted to 2 liters with water. For optimum clarity, the solution can be filtered.

EXAMPLE 4.—PREPARATION OF A 6.25 PERCENT AQUEOUS SOLUTION OF THE COMPLEX, 2-(4'-THIAZOLYL)-BENZIMIDAZOLE - UREA-FORMIC ACID

To a container equipped with stirrer, 650 ml. of water are added and 57 g. of urea are dissolved therein. 63 grams of 2-(4'-thiazolyl)-benzimidazole are suspended in the urea solution. 88 milliliters of formic acid (min. 85% HCOOH) are added. The 2-(4'-thiazolyl)-benzimidazole is completely solubilized and the complex, 2-(4'-thiazolyl)-benzimidazole-urea-formic acid, is produced. The volume of the solution is adjusted to 1 liter. For optimum clarity, the solution can be filtered.

EXAMPLE 5.—PREPARATION OF A 20 PERCENT AQUEOUS SOLUTION OF A COMPLEX FORMED OF 2-(4'-THIAZOLYL)-BENZIMIDAZOLE, UREA, SULFAMIC ACID AND FORMIC ACID

To a container equipped with stirrer, 450 ml. of water are added. 180 grams of urea are dissolved therein, followed by 54 g. of sulfamic acid. 201 grams of grams of 2-(4'-thiazolyl)-benzimidazole are added to the urea-sulfamic acid solution. Partial solubilization of the 2-(4'-thiazolyl)-benzimidazole occurs. 160 ml. of formic acid (min. 85% HCOOH) are added. Solubilization of the 2-(4'-thiazolyl)-benzimidazole is completed and the complex, 2-(4'-thiazolyl)-benzimidazole-urea-sulfamic acid-formic acid, is produced. The volume of the solution is adjusted to 1 liter. For optimum clarity, the solution can be filtered.

EXAMPLE 6.—PREPARATION OF AN 8 PERCENT AQUEOUS SOLUTION OF THE COMPLEX, 2-(4'-THIAZOLYL) - BENZIMIDAZOLE - THIOUREA-SULFAMIC ACID

To a container equipped with stirrer 1600 ml. of water are added and 80 g. of thiourea are dissolved therein followed by 107 g. of sulfamic acid. The solution is heated to 35° C. and 201 g. of 2-(4'-thiazolyl)-benzimidazole are added and stirred until solution is complete with the formation of the complex, 2-(4'-thiazolyl)-benzimidazole-thiourea-sulfamic acid. An additional 80 g. of thiourea are dissolved in the solution. The solution is then adjusted to a volume of 2500 ml. For optimum clarity, the solution can be filtered.

EXAMPLE 7.—PREPARATION OF THE SOLUBLE POWDERED COMPLEX, 2 - (4' - THIAZOLYL)-BENZIMIDAZOLE-UREA-SULFAMIC ACID WITH CITRIC ACID

To a dry solids mixer, 1400 g. of 2-(4'-triazolyl)-benzimidazole, 1320 g. of urea, 730 g. of sulfamic acid and 550 g. of citric acid monohydrate are added providing 4 kg. total solids. These ingredients are premixed into a rough blend. The premix is milled utilizing a suitable comminuter (e.g. a hammer mill fitted with a ⅛-inch screen). The milled material is intimately mixed, and the complex, (4' - triazolyl)-benzimidazole-urea-sulfamic acid, is formed as a soluble powder with the aforesaid citric acid monohydrate blended therein. 335 grams of this soluble powder when dissolved in one quart of water yield 39 fluid ounces, each fluid ounce containing 3 g. of the complex, 2 - (4' - thiazolyl)-benzimidazole-urea-sulfamic acid by weight of the benzimidazole component present therein. 212 grams of the soluble powder dissolved in one quart of water provide 37 fluid ounces, each fluid ounce containing 2 g. of 2-(4'-thiazolyl)-benzimidazole-urea sulfamic acid by weight of the benzimidazole component present therein. This powder can also be utilized in drinking water at various concentrations from 10% to 0.01%, as described hereinabove.

EXAMPLE 8.—PREPARATION OF AN 8 PERCENT AQUEOUS SOLUTION OF THE COMPLEX, 2-(4'-THIAZOLYL) - BENZIMIDAZOLE - THIOUREA-SULFAMIC ACID

To a container equipped with stirrer 1600 ml. of water are added and 80 g. of thiourea are dissolved therein followed by 107 g. of sulfamic acid. The solution is heated to 35° C. and 201 g. of 2-(4'-triazolyl)-benzimidazole are added and stirred until solution is complete with the formation of the complex, 2-(4'-triazolyl)-benzimidazole-thiourea-sulfamic acid. The solution is then adjusted to a volume of 2500 ml. For optimum clarity, the solution can be filtered.

Various changes and modifications of the invention can be made, and to the extent that such variations incorporate the spirit of this invention, they are intended to be included within the scope of the appended claims.

What is claimed is:

1. A coordination complex having the formula:

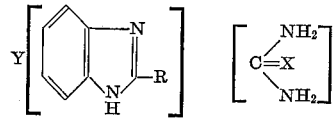

wherein R represents thiazolyl, isothiazolyl or thiadiazolyl, X is a member selected from the group consisting of an oxygen and sulfur atom, and Y is a member selected from the group consisting of sulfamic acid and formic acid and a combination thereof having the molar relationship of one mole of sulfamic acid to two moles of formic acid.

2. The coordination complex, 2-(4'-triazolyl)-benzimidazole-urea-sulfamic acid.

3. The coordination complex, 2-(4'-triazolyl)-benzimidazole-urea-formic acid.

4. The coordination complex, 2-(4'-triazolyl)-benzimidazole-thiourea-sulfamic acid.

5. The coordination complex, 2-(4'-thiazolyl)-benzimidazole-urea-sulfamic acid-formic acid.

References Cited

UNITED STATES PATENTS

| | | | |
|---|---|---|---|
| 3,017,415 | 1/1962 | Sarett | 260—302 |
| 3,055,907 | 9/1962 | Brown | 260—302 |
| 3,102,074 | 8/1963 | Brown | 167—53 |
| 3,111,457 | 11/1963 | Trace | 167—53 |

OTHER REFERENCES

Friedrich et al., Berichte, vol. 89, pp. 820–22.
Chem. Abst. Decennial Index, 1947–1956, p. 1635 S.

ALEX MAZEL, *Primary Examiner.*

SAM ROSEN, RICHARD J. GALLAGHER,
*Assistant Examiners.*